United States Patent [19]

Amour

[11] Patent Number: 5,569,424
[45] Date of Patent: Oct. 29, 1996

[54] METHOD AND APPARATUS FOR RECYCLING WASTE COMPOSITE MATERIAL

[76] Inventor: William E. Amour, P.O. Box 741, Monroe, Wash. 98272

[21] Appl. No.: 401,419

[22] Filed: Mar. 9, 1995

[51] Int. Cl.⁶ .................................................. B29C 35/02
[52] U.S. Cl. ..................... 264/115; 264/DIG. 69; 425/294; 425/305.1
[58] Field of Search ....................... 264/109, 115, 264/122, DIG. 69; 425/305.1, 294

[56] References Cited

U.S. PATENT DOCUMENTS

| | | |
|---|---|---|
| 798,772 | 9/1905 | Fisher . |
| 2,303,884 | 12/1942 | Krehbiel et al. ............................. 25/41 |
| 2,751,626 | 6/1956 | Lyijynen et al. ............................. 18/16 |
| 2,794,211 | 6/1957 | Brown et al. ................................. 18/5 |
| 2,948,651 | 8/1960 | Waag ..................................... 154/110 |
| 3,396,431 | 8/1968 | Kovach et al. ............................. 18/30 |
| 4,874,564 | 10/1989 | Sudani et al. ......................... 264/24.7 |
| 5,040,962 | 8/1991 | Waszeciak et al. ..................... 425/112 |
| 5,085,570 | 2/1992 | Leinweber ............................. 425/195 |
| 5,094,905 | 3/1992 | Murray .................................... 264/115 |
| 5,106,554 | 4/1992 | Drews .................................... 264/112 |
| 5,316,708 | 5/1994 | Drews .................................... 264/40.5 |
| 5,425,904 | 6/1995 | Smits ...................................... 264/37 |
| 5,439,735 | 8/1995 | Jamison ................................. 264/122 |

*Primary Examiner*—Mary Lynn Theisen
*Attorney, Agent, or Firm*—Christensen O'Connor Johnson & Kindness PLLC

[57] ABSTRACT

A method and apparatus for recycling waste composite materials. The method includes prechopping cured waste composite materials into manageably sized strips, conditioning the prechopped strips into resin particulate and loose fibers having a length of approximately one-half to one and one-half inches, mixing the resin particulate and loose fibers with an uncured resin, and placing the resultant mixture into a mold having a forming surface contoured to form a composite part. The strips of the composite material are conditioned by running them through a conditioner that includes a high-speed rotating blade. The rotating blade includes a plurality of angled cutting tips that chop up the waste composite material into loose fibers and resin particulate. The resin particulate and loose fibers pass through holes in a cylindrical screen that surrounds the cutting blade and cutting tips.

23 Claims, 6 Drawing Sheets

METHOD AND APPARATUS FOR RECYCLING WASTE COMPOSITE MATERIAL

FIELD OF THE INVENTION

The present invention relates to methods and apparatus for recycling materials, and more specifically to methods and apparatus for recycling composite materials.

BACKGROUND OF THE INVENTION

As society becomes more aware of the environmental impact of commonly used manufacturing materials and the increasing shortage of fossil fuels, federal, state and local governments are quickly passing regulations to safeguard the environment. Unfortunately, many efforts to improve the environmental impact of one area of industry leads to a dramatic environmental impact on another area.

For example, in order to reduce consumption of fossil fuels and their associated damaging byproducts, federal, state and local governments have passed stringent requirements to regulate fossil fuel consumption in the automobile and aircraft industry. In addition to governmental regulations, increasing fossil fuel prices drive aircraft and motor vehicle manufacturers towards new manufacturing materials and methods that reduce weight and thus fuel consumption. Industries have responded quickly to environmental regulations by introducing greater and greater quantities of various new, lightweight composite materials into their products.

The phrase "composite materials" encompasses a broad range of materials ranging from wood composites, such as plywood, to composites formed of plastic, organic or ceramic matrix systems reinforced with particulate or fibrous reinforcement materials. Common composite fibrous material reinforcements include fiberglass fibers, graphite fibers, Kevlar® fibers, nylon fibers, etc.

Composite materials are themselves an increasing environmental problem. Some of the plastic, epoxy or ceramic matrix systems used in the manufacture of composite materials are harmful to the environment. Many plastic, epoxy and ceramic composite matrix systems are toxic to both plants and animals when in an uncured state. In addition, some composite matrix materials break down into toxic elements as they decompose over time. Other composite matrix materials are relatively immune to oxidation and do not biodegrade, creating a disposal problem due to their long life. Many recent news articles have addressed the growing shortage of waste disposal sites in the United States. As the use of composite materials increases, they present an increasing burden on waste disposal sites.

As various industries, including the automobile and aircraft industry, expand their use of composite materials, concerns regarding the disposal of products made from composite materials is growing dramatically. Only recently have products incorporating composite materials reached the end of their useful life, thus increasing the quantity of composite materials being disposed of. Although the use of composite materials has increased dramatically on a tonnage basis, methods of disposing, recycling or reusing such composite materials are generally unavailable.

It is impossible to put an exact tonnage on the quantity of composite materials disposed of in the United States in one year. The Washington State Waste Characterization survey in 1993 published by the Department of Ecology, listed fiberglass generation alone as 3.6% of all of the material deposited in regulated landfills. Based on these statistics, it is within reason that millions of tons of composite materials are disposed of in landfills in the U.S. alone each year.

The disposal costs for disposing of cured composite materials can range between $90 to $250 per ton of waste. If the waste includes uncured plastic, epoxy or ceramic resins, it is necessary to dispose of the waste under hazardous waste handling regulations. Such hazardous waste materials are not disposable in standard landfills and must be disposed of at specially regulated hazardous waste disposal sites at an increased cost.

The environmental concerns associated with the disposal of composite materials are already on the rise. As the use of composite materials continues to increase in all areas of industry, the problems associated with disposal will grow accordingly unless action is taken to solve the problem now.

As can be seen from the above discussion, there exists a critical need in the industry for methods and apparatus to dispose of or recycle waste cured composite materials and waste uncured matrix material systems, such as plastic or epoxy resins. The present invention is directed toward addressing this need.

SUMMARY OF THE INVENTION

In accordance with this invention a method and apparatus for recycling waste composite materials into new composite parts is provided. In accordance with the method of the present invention, cured waste composite materials are cut into strips. The strips of composite material are then chopped by a conditioner to form resin particulate and short loose fibers. The resin particulate and loose fibers are then mixed with uncured resin and an activating agent to form a composite mixture. The composite mixture is placed into a mold having a forming surface contoured to the exterior shape of the recycled composite part being formed. The composite mixture is allowed to cure, thus forming a recycled composite part.

In accordance with other aspects of this invention, the strips of composite material are reduced to resin particulate and loose fibers having a length of between one-half and one and one-half inches. The loose fibers and resin particulate may be mixed with different uncured resin systems in order to produce railroad ties, bumper blocks, picnic benches, or other recycled composite parts.

In accordance with further aspects of this invention, a conditioner is used to reduce waste composite materials into loose fibers and resin particulate. The embodiment includes a housing having an inlet and an outlet. A rotating cutting blade is mounted within the housing adjacent a screen having a plurality of holes. Waste composite material is introduced into the housing through the inlet and is formed into loose fibers and resin particulate by the cutting blade. The loose fibers and resin particulate pass through the holes in the screen and out of the housing through the outlet.

In accordance with yet other aspects of this invention, the screen is cylindrical and surrounds the circumference of the cutting blade. The cutting blade is formed of a flat plate having one or more cutting tips that extend perpendicular to the plane of the blade. Each cutting tip includes an upper portion and a lower portion extending at an angle of approximately 135° to the upper portion. As the cutting plate rotates at high velocity, a suction is produced through the inlet and an exhaust air flow is produced at the outlet.

One of the advantages of the present invention is that it is capable of reducing waste composite materials into resin particulate and short loose fibers. Past unsuccessful attempts at recycling composite materials have chopped the waste composite materials to produce smaller pieces of composite material formed of both resin and loose fibers. Unlike prior unsuccessful attempts, the present invention produces resin particulate and loose fibers that may be mixed with uncured resin in order to form an approximately homogeneous mixture. The mixture of uncured resin particulate and loose fibers may be poured into a mold or otherwise used to form recycled composite parts.

The present invention allows the increasing quantity of waste composite material to be recycled into new, useful composite parts. Thus, the present invention fulfills a long-felt need for methods to recycle composite materials.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
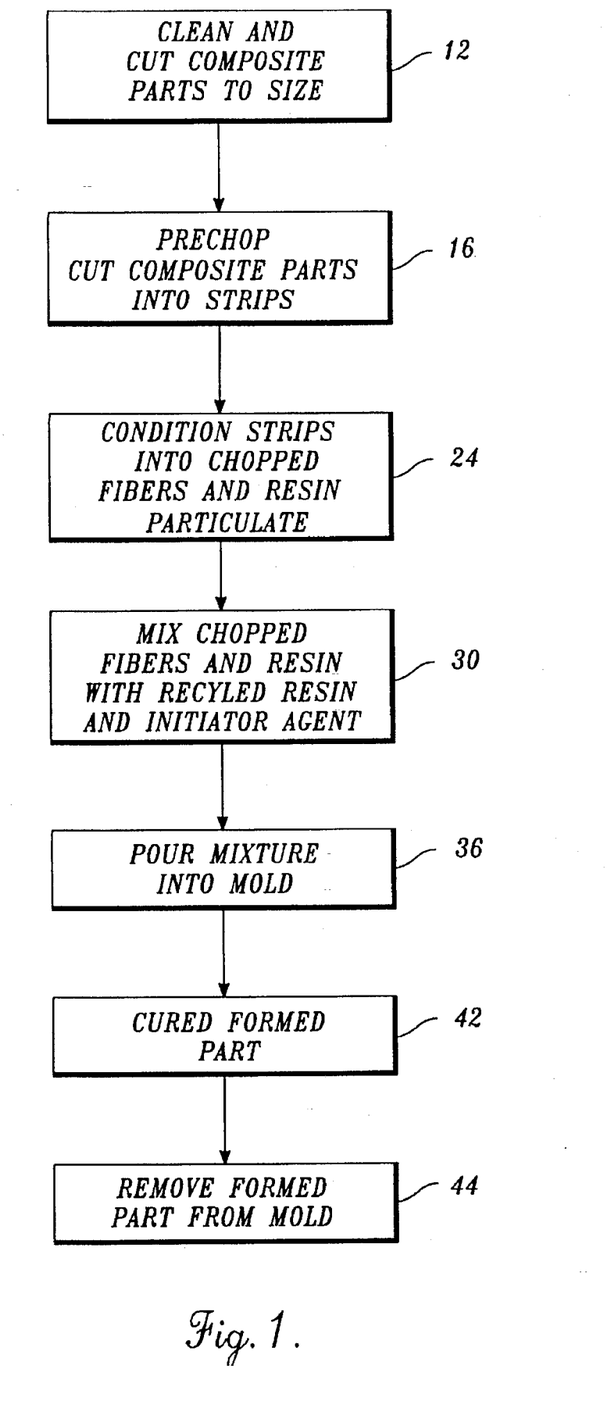
FIG. 1 is a flow chart illustrating a method of recycling waste composite materials in accordance with the present invention.
Figure 2:
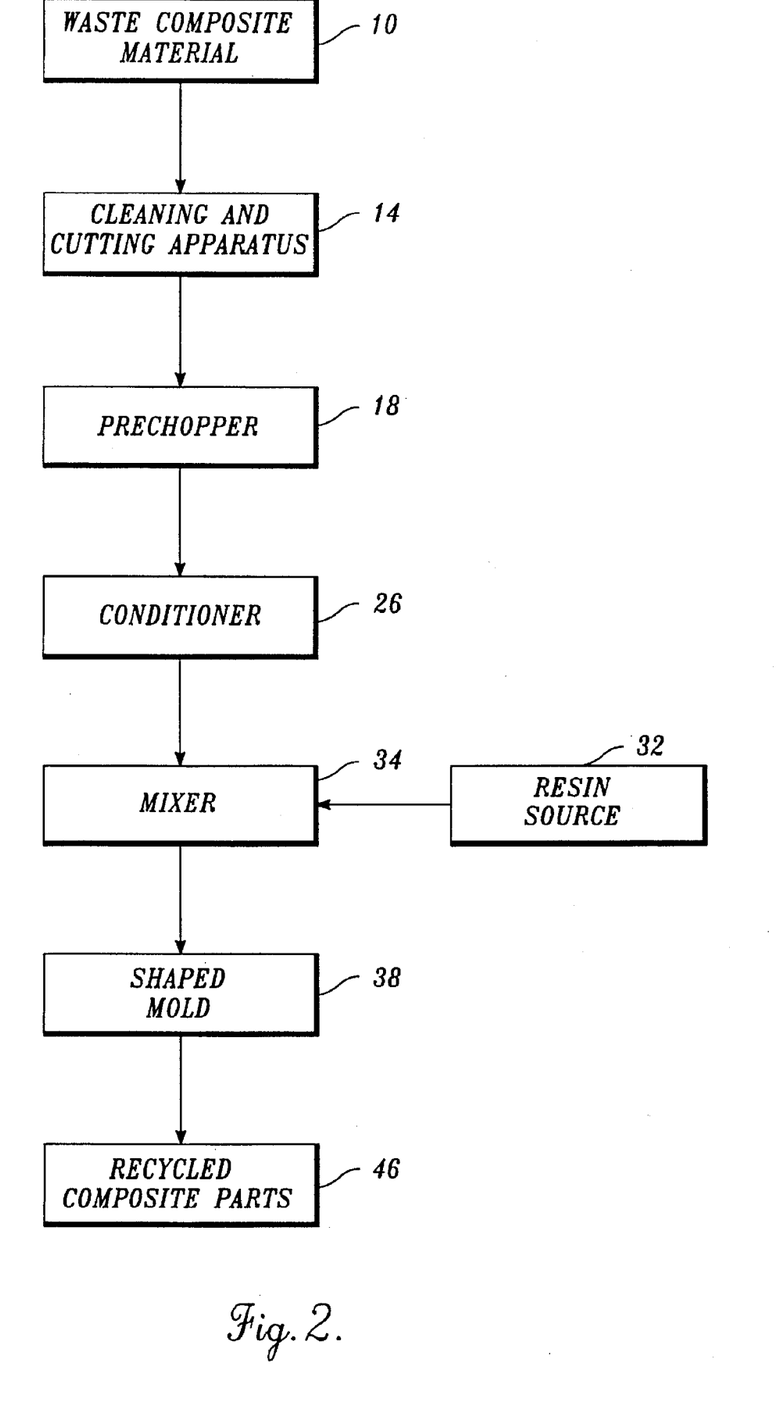
FIG. 2 is a schematic illustration of the components of an apparatus for recycling waste composite materials according to the present invention.

FIGS. 1 and 2 illustrate a method and apparatus, respectively, for recycling waste composite materials according to the present invention. Waste composite materials 10 are obtained from various industrial sources, including manufacturers in the aircraft industry, vehicle industry, boating industry, hot tub industry, etc. The waste composite materials 10 can include both cured composite parts and scrap and uncured composite resin systems, prepregs and fibrous or particulate reinforcing materials. For example, cured composite parts include car bumpers, fenders, aircraft parts, hot tubs, etc., formed of epoxy, bismolyamide, or other resin systems having either unidirectional or cloth fibrous reinforcements, such as glass fibers, graphite fiber, Kevlar® fibers, etc. Uncured composite resins can include uncured epoxy, bismolyamide or other resins that are past their expiration date, have been contaminated in some form, or are no longer of any use to the purchaser. Uncured waste composite materials can also include uncured prepreg material, such as epoxy or bismolyamide prepreg having fiberglass, Kevlar® or graphite fibrous reinforcements. Additional waste composite materials could include fiberglass fibers, graphite fibers, Kevlar® fibers, fiberglass insulation, or other fibrous or particulate reinforcement materials.

When cured composite materials are used in the recycling process, they are first processed in accordance with the present invention to produce materials of a form usable to form new composite materials. Cured and uncured composite materials are first cleaned 12 or filtered depending on the material to remove undesirable foreign matter such as dirt, etc. Cured composite materials may be cleaned using water or another suitable solvent to remove loose debris, dirt, etc. Uncured liquid resin systems may be filtered using screens or other suitable filtering apparatus known to those of ordinary skill in the art.

Often, waste composite materials are supplied in the form of large parts or panels such as car fenders, doors, aircraft control surfaces, bath tubs, etc., thus necessitating cutting up of the material to reduce it to a reasonable size. The size to which the material is cut into depends upon the prechopping apparatus 18 available. Some chopping or cutting apparatus is capable of handling larger materials than other apparatus and thus the waste material must be sized accordingly. After cleaning, the cured composite materials are reduced to a manageable size 12 by cutting apparatus 14. Depending upon the size and composite material from which the waste is formed, various hand saws, table saws, band saws, etc., may be used to cut the cured composite materials into a manageable size.

Once the cured composite materials are reduced to a manageable size, they are prechopped into small strips 16 using a prechopper 18. In the preferred embodiment, the prechopper 18 is a commercially available hammermill-type chopping apparatus capable of reducing up to 1" thick cured composite materials into strips approximately 6" long and 1–2" wide. In alternate embodiments of the invention, other prechopping apparatus can be used to reduce the cured composite materials into smaller pieces, including hand cutting, band saws, circular saws, etc. A hammermill-type chopper was found to be advantageous due to its ability to rapidly process a large quantity of waste composite material.

The prechopped strips of composite material are then conditioned 24 into short loose fibers and resin particulate using a conditioner 26 (FIGS. 2 and 3) that operates in accordance with the present invention. The conditioner 26 reduces the waste cured composite materials into loose fibers approximately ½–1½" long and resin particulate matter.

The structure and operation of the conditioner 26 is described in detail below. Although in alternate embodiments of the invention, the conditioner 26 could function differently than described below, it is important that the conditioner 26 be capable of reducing the waste cured composite material into loose fibers and resin particulate that may be used to form new composite materials.

The loose fibers and resin particulate produced by the conditioner 26 are combined and mixed 30 with a virgin or waste uncured resin system provided from a resin source 32 in a mixer 34. The mixer 34 thoroughly mixes the loose fibers and the resin particulate from the conditioner 26 with the uncured resin to form a fairly uniform, homogenous mixture of uncured resin, fibrous reinforcement, and resin particulate reinforcement.

In the preferred embodiment, the mixer 34 is a screw-type mixer, commonly known and used by those of ordinary skill in the art. However, any of a number of different mixing apparatus can be used. The best results may be achieved by experimenting with different types of mixers depending upon the type of resin and recycled composite materials being used. However, it is important that the mixer 34 be capable of mixing the loose fibers, resin particulate and uncured resin to form a fairly homogenous mixture to produce the most advantageous results.

The resin provided to the mixer 34 from the resin source 32 could be an epoxy, bismolyamide, plastic or other resin system in a liquid form. If the resin system used is either an epoxy or bismolyamide resin system, it is important that the resin be mixed with an appropriate activating agent, either in the resin source 32, or in the mixer 34, in order to cause the resin system to set up or cure after molding. The appropriate activator and the mount of activator added per gallon of resin differs depending upon the resin system and may be readily determined by one of ordinary skill in the art by reference to appropriate documentation.

After mixing, the mixture of uncured resin, loose fibers, and resin particulate is driven out of, extruded out of, or otherwise poured 36 out of the mixer 34 into a shaped mold 38. As described in detail below, the mold 38 includes a forming surface shaped to the exterior dimensions of the composite part being formed. Prior to or after pouring the mixture into the mold, uncured composite prepreg, and/or waste fiber or cloth composite materials can be placed within the mold to add additional reinforcement to the formed part. After the mold is filled, the part is cured under appropriate environmental conditions for the matrix system being used. For example, some epoxy matrix systems cure at room temperature and atmospheric pressure while other matrix systems require elevated temperatures and pressures or reduced oxygen environments to cure. The appropriate environmental conditions used to cure the resin are determined from product literature on the type of resin systems or types of prepreg used. After curing, the formed recycled composite part 46 is removed 44 from the mold. The formed recycled composite part can then be trimmed, painted or otherwise processed in any manner desired.

The present invention may be used to form a wide range of recycled composite parts. Two exemplary recycled composite parts (a bumper block 110 and a railroad tie 112 (FIGS. 11 and 12)) formed using the present invention are described below. However, the present invention may be used to form a wide range of recycled composite parts, and the exemplary recycled composite parts illustrated are not meant to be limiting.

Figure 3:
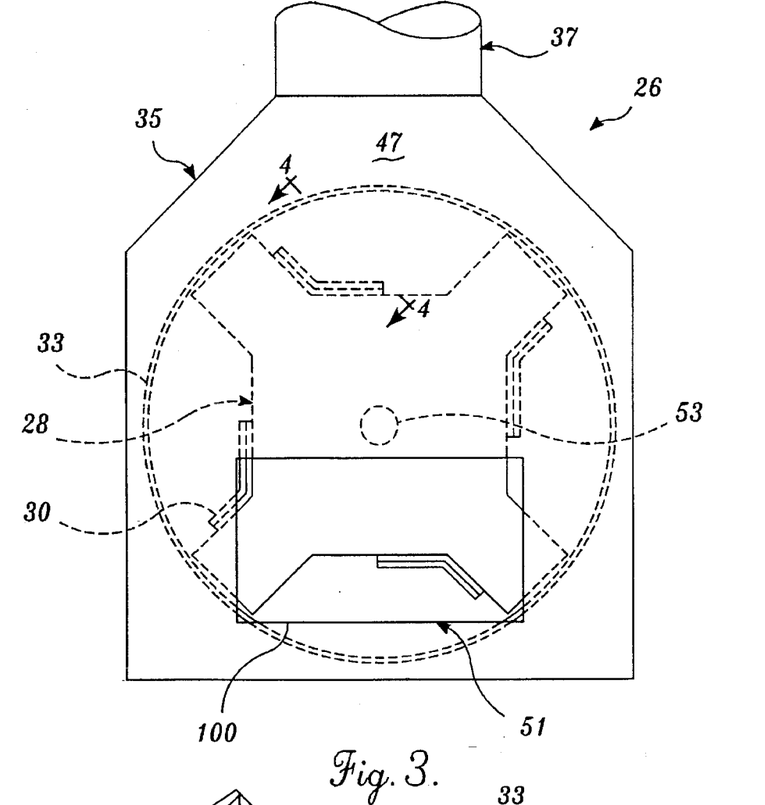
FIG. 3 is a front elevation view of an apparatus for chopping and conditioning waste cured composite materials in accordance with the present invention.
Figure 4:
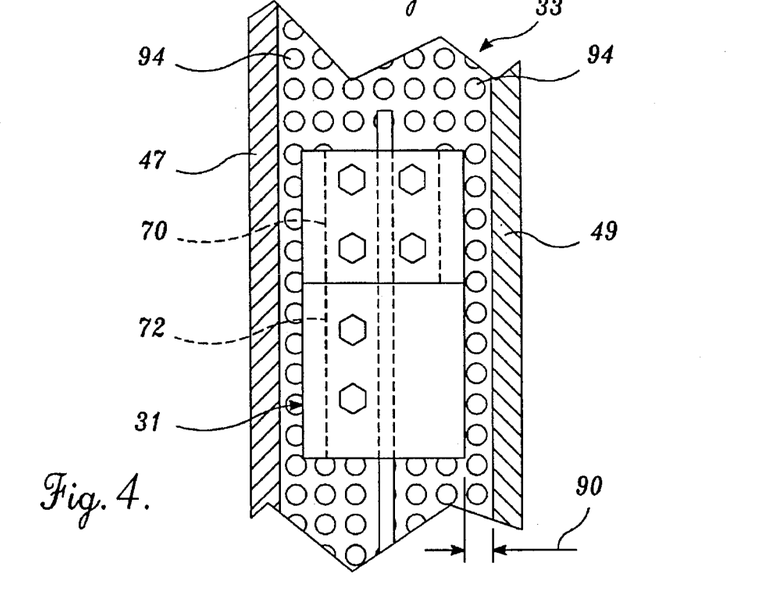
FIG. 4 is an enlarged, cutaway view of a portion of the cutting blade of the apparatus of FIG. 3 along line 4—4.

As discussed above, one important feature of the present invention is its ability to reduce waste composite materials into short fibers and resin particulate using a conditioner 26. The preferred embodiment of the conditioner 26 will now be described by reference to FIGS. 3–7. The conditioner 26 includes a high-speed rotating cutting blade 28 having four individual cutting tips 31, a cylindrical filtering screen 33, a housing 35, an outlet 37 and a drive motor (not shown). As best seen in FIGS. 3 and 4, the housing 35 is generally rectangular shaped, having front and rear walls 47 and 49 and side walls (not shown) that form an enclosed housing around the cutting blade 28 and filtering screen 33. The front wall 47 includes a rectangular-shaped opening 51 through which prechopped strips of composite materials from the prechopper 18 are introduced into the conditioner 26.

The cutting blade 28 is rotatably mounted within the interior of the housing 35 on a drive axle 53 that is connected to and rotated by the drive motor (not shown). In the preferred embodiment, the cutting blade 28 is mounted on the axle 53 through the use of a cylindrical receptacle 54 located at the center of the cutting blade. The cylindrical receptacle 54 extends outward normal to the surface on the cutting blade 28 and includes a central bore sized to fit over the drive axle 53. The receptacle 54 is keyed or otherwise secured to the drive axle 53 so that, as the drive axle rotates, it causes the cutting blade 28 to rotate within the interior of the housing 35.

Figures 5, 6, 7:
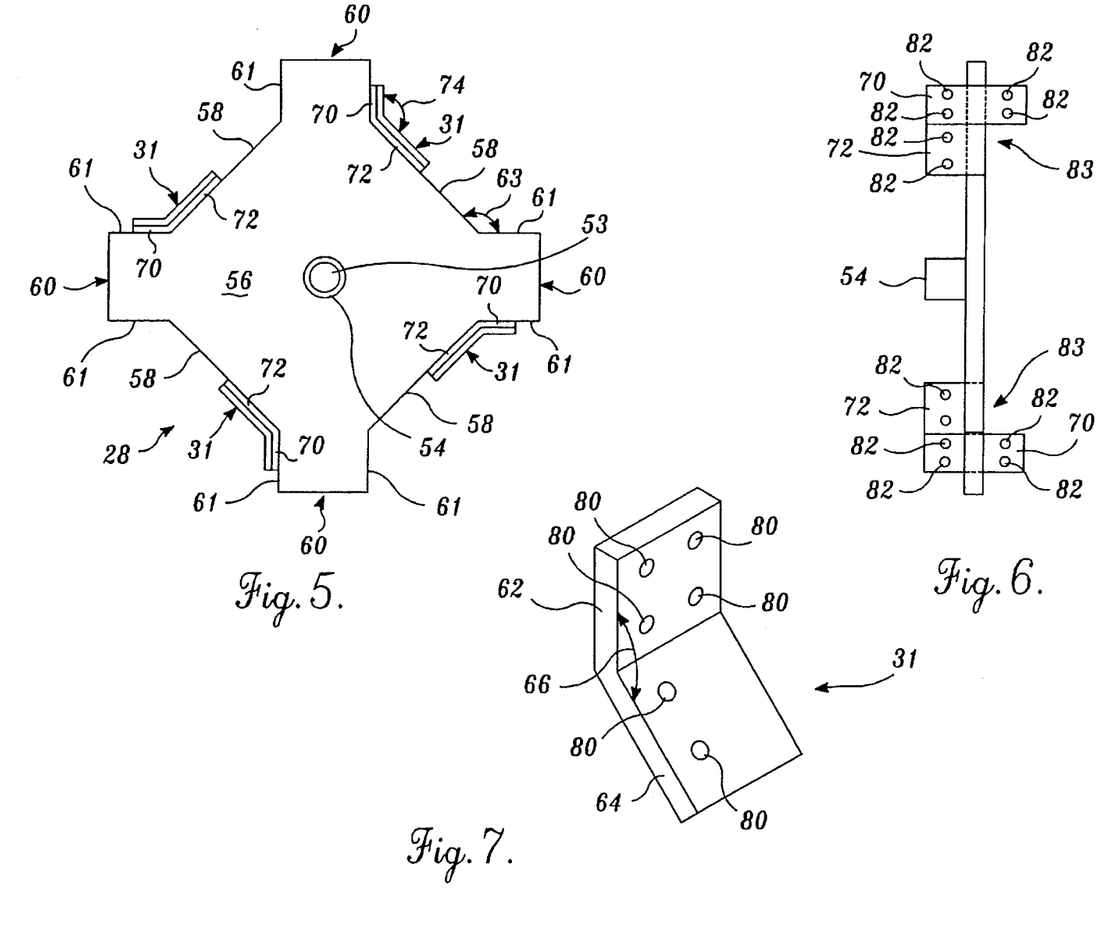
FIG. 5 is a front view of the cutting blade of the apparatus of FIG. 3.
FIG. 6 is a side view of the cutting blade of FIG. 5 with the cutting tips removed.
FIG. 7 is an enlarged perspective view of a cutting tip.

As best seen in FIGS. 5 and 6, the cutting blade 28 compresses a generally square, flat plate 56 having two pairs of opposing sides 58. The blade 28 also comprises four rectangular arms 60, one of which extends outward from each corner of the flat plate 56. The opposing sides 61 of each arm 60 extend at an angle 63 (FIG. 5) of approximately 135° to the sides 58 of the flat plate 56. The four cutting tips 31 (FIGS. 5 and 7) are mounted in the intersections between the sides 58 and sides 61 such that each cutting tip faces in the same direction with respect to a fixed viewer watching the rotating cutting blade.

Each cutting tip 31 (FIG. 7) is formed of a rectangular upper portion 62 that is joined to a rectangular lower portion 64 at an angle 66 of approximately 135°. The upper portion 62 includes four holes 80 while the lower portion 64 includes two holes 80 through which fasteners are inserted to attach the cutting tip 31 to the cutting blade 28 as described below. In the preferred embodiment, each cutting tip is formed of heat-treated hardened steel or other suitable material capable of withstanding high-speed impacts with recycled composite materials fed into the conditioner 26.

Each cutting tip 31 is attached to the cutting blade 28 using fasteners (not shown) that pass through the holes 80 in the cutting tips 31 and are received in correspondingly aligned holes 82 in attachment brackets 83 located on the cutting blade. Each attachment bracket 83 is formed of a rectangular outer bracket 70 and a rectangular inner bracket 72. Each outer bracket 70 is welded or otherwise attached to one side 61 of each rectangular arm 60 and extends approximately perpendicular to the plane of the rectangular arm. Each outer bracket 70 includes four holes 82 that are aligned with the holes 80 on the upper portion 62 of a cutting tip 31 when the cutting tip is attached to the attachment bracket 83. Each inner bracket 72 is welded or otherwise fastened to the side 58 of the cutting blade adjacent the intersection between the side 58 of the cutting blade and the side 61 of the rectangular arm 60. Each inner bracket 72 includes two holes 82 that are aligned with the holes 80 in the lower portion 64 of the cutting tip 31 when the cutting tip is attached to the attachment bracket. As illustrated in FIG. 4, the width of each cutting tip 31 is sized so that there is a gap 90 of approximately an eighth of an inch between the sides of the cutting tip and the opposing walls 47 and 49 of the housing 35.

The cutting blade 28 and cutting tips 31 are enclosed around the circumference of the cutting blade by a cylindrical mesh or filtering screen 33 that is attached to and extends between the opposing walls 47 and 49 of the housing 35. The screen 33 includes a plurality of openings 94 spaced around the circumference of the screen. The openings 94 allow properly sized conditioned fibers and resin particulate to pass through the screen 33 during operation of the conditioner 26.

As discussed above, the from wall 47 of the housing 35 includes a rectangular opening 51 (FIG. 3) located slightly below the drive axle 53 and having a width sufficient to allow prechopped composite materials to be fed into the conditioner 26. In the preferred embodiment, the opening 51 is sized so that the lower edge 100 of the opening is approximately the same width as the cord of the cylindrical screen 33 in the location of the lower edge. The top of the housing 35 opens into an exhaust outlet 37 through which conditioned composite fibers and resin particulate may exit the housing during operation of the conditioner 26.

In an exemplary embodiment, the diameter of the cylindrical screen 33 is approximately 46", and the maximum diameter of the cutting blade 28 is approximately 45⅝". The width of the cutting tips 31 is approximately 6", while the length of the top portion 62 is approximately 4½", and the length of the bottom portion 64 is approximately 7½". In the exemplary embodiment, the cutting blade 28 operates at approximately 3,600 RPM and the diameter of the holes 94 is approximately ½". The cutting blade 28 and cutting tips 31 are formed of ¾-inch thick heat-treated steel. The exemplary embodiment is capable of conditioning waste composite materials approximately 2" wide by 1" thick.

Although an exemplary embodiment of the invention is described for illustrative purposes, the sizes, configuration and materials from which the conditioner 26 is formed may be changed without departing from the scope of the invention.

During operation, the cutting blade 28 is rotated at high speeds while strips of waste composite material are fed into the conditioner 26 through the opening 51. As waste composite material is fed into the opening 51, it is cut off by the cutting tips 31. The combination of the cutting blade 28 and angled cutting tips 31 produces a suction air flow through the opening 51 and an exhaust air flow out the outlet 37. This suction air flow helps to draw in and maintain cut-off pieces of waste composite material within the conditioner 26.

The waste composite material cut off by the cutting tips 31 is then further chopped and conditioned by the cutting blade 28 and cutting tips 30 as it is rotated within the interior of the filtering screen 33 (FIGS. 3 and 4) until it is reduced to a usable material. As the waste composite material is reduced to appropriately sized resin particulate and loose fibers, it filters through the holes 94 in the filtering screen 33 and is blown out the outlet 37. The conditioned waste material is then stored in a suitable container until it is used to form recycled composite parts.

The size of the loose fibers and resin particulate produced by the conditioner 26 may be adjusted by changing the width of the cutting tips 30, the size of the holes 94 and the speed at which the cutting blade 28 rotates. The exemplary embodiment described above produces loose fibers having a length of approximately one-half to one and one-half inches.

The loose fibers and resin particulate produced by the conditioner 26 are in a proper form to be used as fibrous and particulate reinforcements in new composite parts. One of the advantages of the conditioner 26 of the present invention is that it produces loose short fibers and resin particulate. Prior art attempts at recycling composite materials have not produced the advantageous results of the present invention. Past efforts at reducing waste composite materials to a usable form have produced small pieces of waste composite formed of both resin and reinforcing fibers that were not useful in the formation of new composite parts.

Two exemplary recycled composite parts produced with the present invention, a bumper block 110 and a railroad tie 112 (FIGS. 11 and 12), will now be described. The railroad tie 112 is formed using a forming apparatus 14 illustrated in FIGS. 8 and 9. The forming apparatus 114 includes a mold 116 whose interior cavity is contoured to form the exterior shape of the railroad tie. The mold 116 is formed of two opposing sides 118, a fixed end wall 120, and an opposing actuated end wall 122. In the preferred embodiment, the forming apparatus 114 forms two railroad ties 112 at the same time and thus includes a center dividing wall 124 that is located in the center of the mold 116 and extending the length of the mold. The dividing wall 124 divides the mold 116 into the separate forming cavities. The opposing walls 118, fixed wall 120, and actuated wall 122 combined with a floor 126 form a box having two rectangular compartments that are open on the top.

Figure 8:
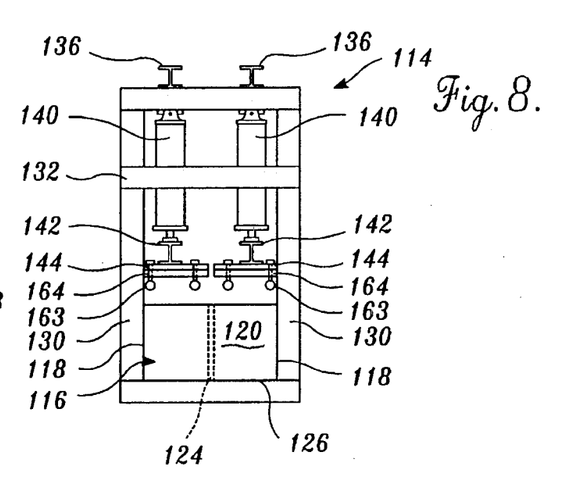
FIG. 8 is an end view of an apparatus to form railroad ties from recycled composite materials in accordance with the present invention.
Figure 9:
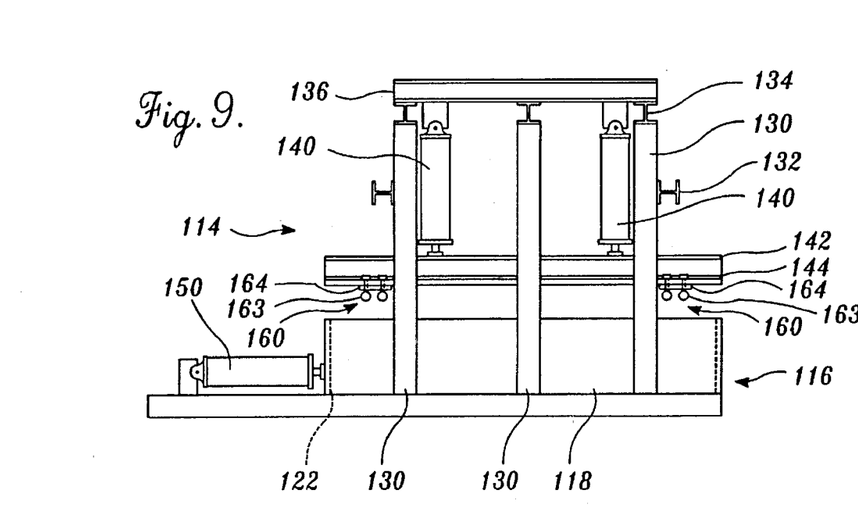
FIG. 9 is a side elevation view of the apparatus of FIG. 8.

The forming apparatus 114 includes a frame formed of three pairs of opposing upright beams 130 that are located adjacent the opposing sides 118 of the mold 116 and extend perpendicularly upward. The two outer pairs of upright beams 130 are reinforced by a cross-beam 132 that is welded to the individual beams forming the pair of beams in order to reinforce the frame. A top beam 134 is welded or otherwise joined to the top of each pair of opposing upright beams 130. Two longitudinal support beams 136 are welded or otherwise fastened across the top of the three top beams 134. Each of the longitudinal support beams 136 is located directly above one of the forming cavities in the mold 116.

One end of two hydraulic actuators 140 are attached to opposite ends of each of the longitudinal support beams 136. The opposite end of each hydraulic actuator 140 is attached to a lower longitudinal beam 142. Each lower longitudinal beam 142 is located directly above one of the forming cavities within the mold 116. A cover sheet 144 is attached to the lower surface of each of the lower longitudinal beams 142. Each cover sheet 144 is sized to form a close tolerance fit with the walls of one of the forming cavities in the mold 116.

A railroad tie 112 (FIG. 2) is formed by pouring the mixture of loose fibers, resin particulate, and uncured resin from the mixer 34 into each of the forming cavities in the mold 116. After the forming cavities of the mold 116 are approximately filled, the hydraulic actuators 140 are energized to lower the top sheets 144 into the forming cavities. A hydraulic actuator 150 attached to the actuated wall 122 is also energized in order to move the wall 122 inward. The combination of the downward moving top sheet 144 and inward moving actuated wall 122 places a hydrostatic force on the composite mixture within the interior of the mold 116. The force provided by the actuators 140 and 150 is maintained until the mixture within the mold 116 has cured, thus producing a composite part.

In the preferred embodiment, a force of approximately 140,000 psi is developed on the composite mixture. However, depending upon the resin system and type of reinforcing fibers used, forces of other magnitude could be applied to the composite mixture.

After the composite part has fully cured, the actuators 140 and 150 are energized to move the top sheets 144 upward and the actuated wall 122 rearward, thus allowing the formed composite part to be removed from the mold 116. Depending upon the resin system used, the forming apparatus 114 may also be placed within an oven or otherwise heated to elevate the temperature of the composite mixture to promote curing.

It is advantageous to form rectangular recesses 162 (FIG. 12) in the top surface of the railroad tie 112 at the points where the rails (not shown) are to be attached. The recesses 162 can be formed during molding or cut out after molding is complete. In the preferred embodiment, the recesses 162 are formed during molding by fastening properly sized rectangular blocks 164 (FIGS. 8 and 9) to the top sheets 144 at the appropriate locations prior to molding. The blocks 164 are pressed into the composite mixture within the mold 16 during forming, thus forming the recesses 162.

Figures 11, 13:
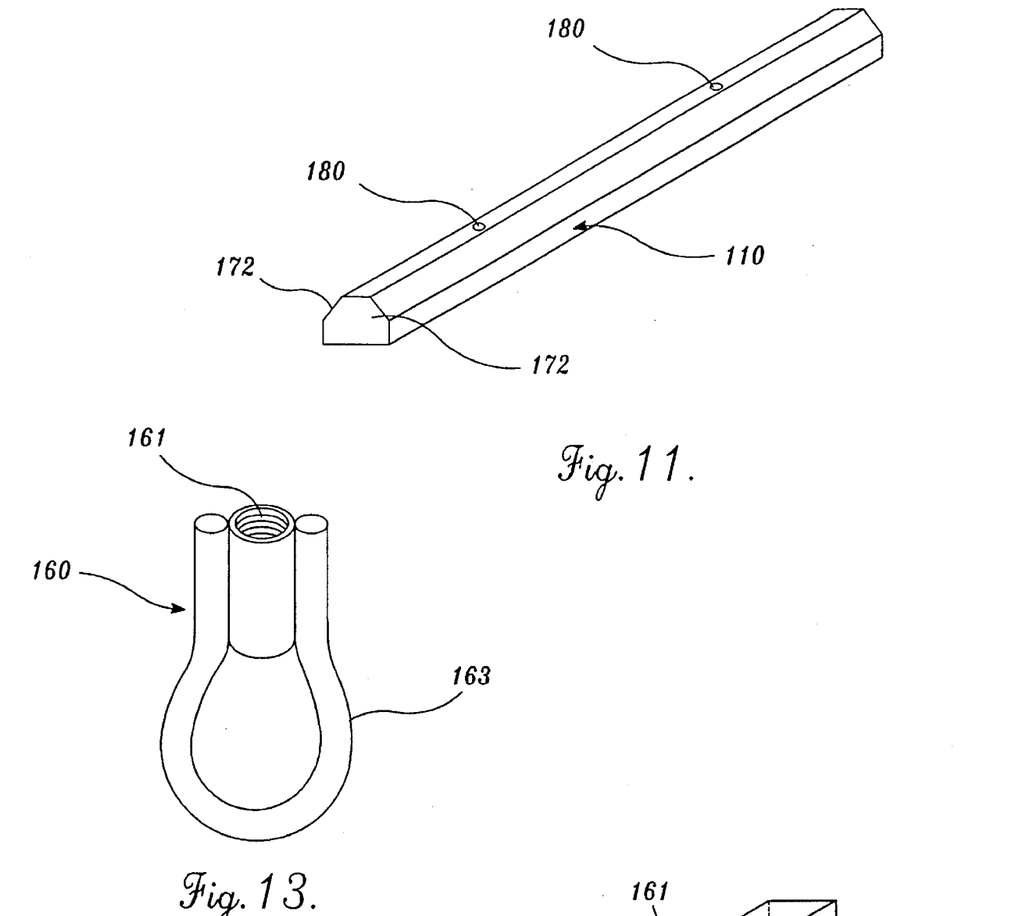
FIG. 11 is a perspective view of a bumper block formed from recycled composite materials in accordance with the present invention.
FIG. 13 is a perspective view of a bolt anchor of the railroad tie of FIG. 12.
Figure 12:
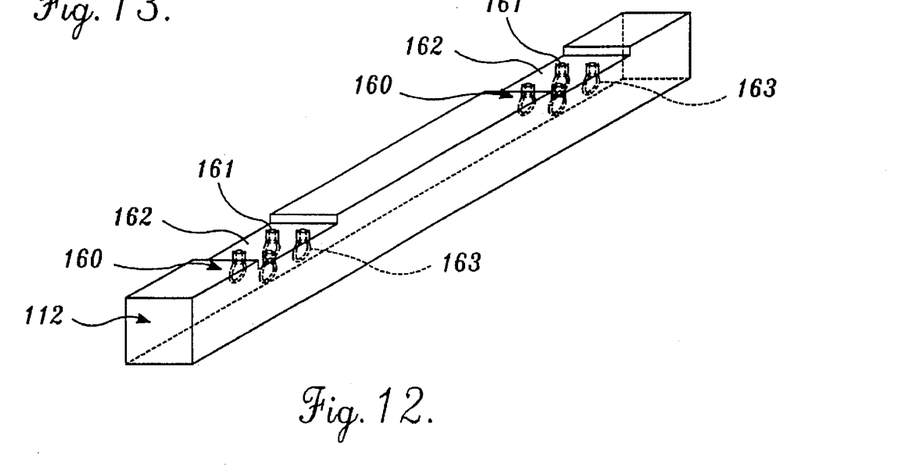
FIG. 12 is a perspective view of a railroad tie formed of recycled composite materials in accordance with the present invention.

As illustrated in FIG. 12, it is advantageous to form bolt anchor reinforcements 160 into the railroad tie 112 at the locations where rails (not shown) are to be attached to the railroad tie. The bolt anchor reinforcements 160 (FIG. 13) include threaded receptacles 161 that are formed directly into the structure of the composite railroad tie 112. The bolt anchor reinforcements 160 also include steel reinforcement bands 163 that are welded or otherwise fastened to the sides of the threaded receptacles 161. During forming, the composite mixture flows through the band 163, thus securing the bands and receptacles 161 in the railroad tie when cured.

In order to ensure that the bolt anchor reinforcements 160 are maintained at the proper position during molding, it is advantageous to index them by bolting or otherwise attaching them to the rectangular blocks 164 and top sheet 144 prior to forming a composite part (FIGS. 8 and 9). As the top sheets 144 are lowered into the mold 116, the bolt anchor reinforcements 160 are pressed downward into the composite mixture within the cavity 116. As the composite mixture cures, the bolt anchor reinforcements 160 are formed directly into the structure of the railroad tie 112. After curing, the bolt anchor reinforcements 160 are unbolted or otherwise released from the rectangular blocks 164 top sheet 144 and the formed composite part is removed.

In the preferred embodiment, it has been found advantageous to reinforce the railroad tie 112 with unidirectional prepreg and/or steel rebar. The unidirectional prepreg or steel rebar are placed within the mold 116 prior to pouring the composite mixture into the mold. As the composite mixture is poured into the mold, it flows around the rebar and any unidirectional prepreg within the mold. The rebar or prepreg is then cured into the composite mixture thus further reinforcing the structure of the railroad tie.

Figure 10:
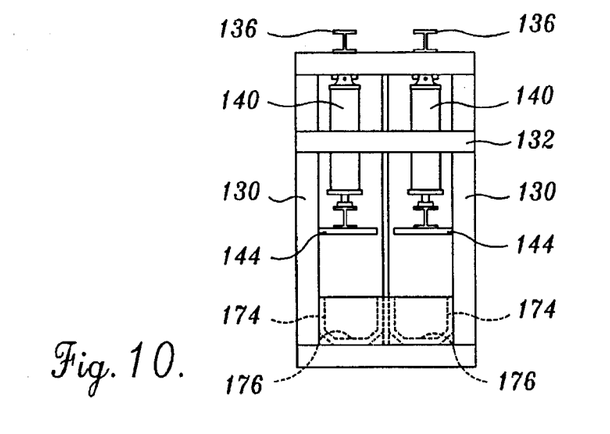
FIG. 10 is an end view of a second embodiment of the apparatus of FIG. 2 used to form bumper blocks.

The forming apparatus 114 is also used to form the bumper block 110. It is advantageous to form the bumper block 110 with beveled edges 172 as illustrated in FIG. 11. The beveled edges 172 are formed by placing inserts 174 (FIG. 10) within the forming cavities of the mold 116. The inner surface 176 of the inserts 174 are contoured to form the beveled surfaces 172. The inserts 174 may be formed of steel or another suitable material. After the inserts 174 are placed within the mold 116, the mold is filled with a composite mixture, and the bumper block 110 is formed in a manner similar to that described above with respect to the railroad tie 112.

After forming, the bumper block 110 is removed from the mold and two handling holes 180 are drilled through its thickness. The bumper block 110 may be transported by extending cables through the holes 180. The holes 180 may also be used to attach the bumper block 110 to a roadway or other structure.

Although two exemplary embodiments of recycled composite parts are described above, the present invention may be used to form other recycled composite parts. Similarly, while the preferred embodiment of the invention has been illustrated and described, it will be appreciated that various changes can be made without departing from the spirit and scope of the invention.

The embodiments of the invention in which an exclusive property or privilege is claimed are defined as follows:

1. A method of recycling waste hard composite materials formed of reinforcing fibers cured in a resin system into a recycled composite part comprising:
    (a) reducing the cured hard composite materials into small strips of composite material;
    (b) conditioning the strips of composite material with a rotating blade to form resin particulate and separate short loose reinforcing fibers;
    (c) mixing the resin particulate and loose reinforcing fibers with an uncured resin to form a composite mixture;
    (d) placing the composite mixture into a mold having a forming surface in the shape of the recycled composite part; and
    (e) allowing the composite mixture to cure and form the recycled composite part.

2. The method of claim 1, further comprising conditioning the strips of composite material into loose fibers having a length of between one-half to one and one-half inches and resin particulate.

3. The method of claim 1, further comprising reducing the cured composite materials into strips between approximately two to four inches wide.

4. The method of claim 1, further comprising placing the composite mixture into a mold having a forming surface contoured to form a railroad tie.

5. The method of claim 1, further comprising placing the composite mixture into a mold having a forming surface contoured to form a bumper block.

6. The method of claim 1, further comprising conditioning the strips of composite material by chopping them with a high-speed rotating blade having one or more angular cutting tips.

7. The method of claim 6, further comprising conditioning the strips of composite material by chopping the strips with a rotating blade enclosed within a cylindrical screen having a plurality of holes.

8. An apparatus for conditioning waste composite materials into loose fibers and resin particulate for use in forming recycled composite parts, the apparatus comprising:
    (a) a housing having an inlet through which waste composite materials are introduced and an outlet through which loose fibers and resin particulate exit the housing;
    (b) a screen having a plurality of holes located within the housing; and
    (c) a high-speed rotating blade mounted within the housing adjacent the screen so that waste composite material introduced through the inlet is contacted and conditioned by the blade to produce loose fibers and resin particulate that passes through the holes in the screen and out of the housing through the outlet.

9. The apparatus of claim 8, wherein the screen is cylindrical and surrounds the rotating cutting blade.

10. The apparatus of claim 8, wherein the cutting blade includes one more angled cutting tips.

11. The apparatus of claim 10, wherein the cutting blade is formed of a flat plate and wherein the cutting tips extend perpendicular to the plane of the flat plate.

12. The apparatus of claim 10, wherein each cutting tip includes an upper portion and a lower portion that extends at an angle of approximately 135° to the upper portion.

13. The apparatus of claim 8, wherein high-speed rotation of the cutting blade produces a suction at the inlet and an exhaust air flow at the outlet.

14. An apparatus for recycling waste composite materials, formed of reinforcing fibers cured in a resin system, into a recycled composite part, the apparatus comprising:

a cutter that reduces the waste composite materials into manageable sized strips;

a conditioner that reduces the strips of composite material into resin particulate and short loose fibers using a rotating blade mounted within a screen;

a mixer that mixes the resin particulate and loose fibers with an uncured resin to form a composite mixture;

a mold having a forming surface contoured to form the recycled composite part; and means for filling the mold with the composite mixture from the mixer.

15. The apparatus of claim 14, wherein the forming surface is contoured to form a railroad tie from the composite mixture.

16. The apparatus of claim 14, wherein the forming surface is contoured to form a bumper block from the composite mixture.

17. The apparatus of claim 14, wherein the conditioner includes a rotating blade having one or more angled cutting tips.

18. The apparatus of claim 17, wherein the cutting tips extend approximately perpendicular to the plane of the blade.

19. The apparatus of claim 14, wherein the conditioner reduces the strips of a composite material in the loose fibers between approximately ½" and 1½" long and resin particulate.

20. A method of recycling waste composite materials formed of reinforcing fibers cured in a resin system into a recycled composite part, comprising:

conditioning the composite materials with a rotating blade mounted adjacent a screen to produce resin particulate and separate short loose reinforcing fibers;

mixing the loose reinforcing fibers with an uncured resin to form a composite mixture;

placing the composite mixture into a mold having a forming surface in the shape of the recycled composite part; and allowing the composite mixture to cure to form the composite part.

21. The method of claim 20, further comprising placing the composite mixture into a mold having a forming surface contoured to form a railroad tie.

22. The method of claim 20 further comprising conditioning the strips of composite material with a rotating blade that is mounted within a cylindrical screen having a plurality of holes.

23. The method of claim 20, further comprising conditioning the strips of composite material to form loose fibers having a length of between ½ to 1½ inches.

* * * * *